Nov. 24, 1970     A. J. MAREK     3,543,091
SOLID STATE CIRCUIT BREAKER
Filed Dec. 23, 1968
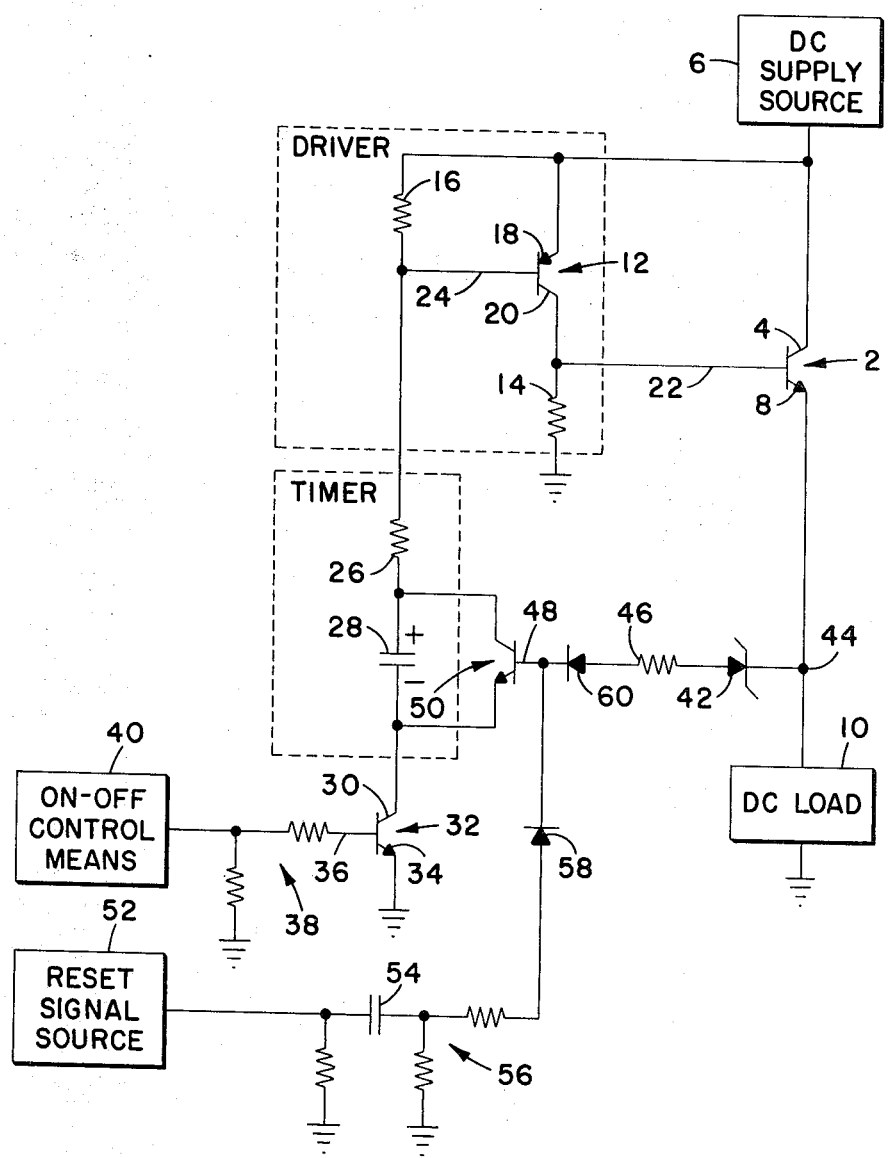
ALBERT J. MAREK
INVENTOR
BY Robert M. Sperry
ATTORNEY

United States Patent Office 3,543,091
Patented Nov. 24, 1970

3,543,091
SOLID STATE CIRCUIT BREAKER
Albert J. Marek, Dallas, Tex., assignor to LTV Aerospace Corporation, Dallas, Tex., a corporation of Delaware
Filed Dec. 23, 1968, Ser. No. 786,212
Int. Cl. H02h 3/24
U.S. Cl. 317—22
5 Claims

ABSTRACT OF THE DISCLOSURE

This invention is a solid state circuit breaker for controlling current flow from a direct current source in response to an applied control signal. A driver circuit is connected in series between the source and the base of the solid state circuit breaker to control the application of bias potential to the base of the circuit breaker. A control transistor is connected in series between the driver circuit and ground with a timing capacitor connected between the collector-to-emitter junction of the control transistor. The charging of the iming capacior is operable to turn off the driver circuit when the voltage responsive Zener diode, connected to sense the potential at the point between the source and the load, detects a potential below a predetermined level. A reset source is also provided with a capacitor connected in series therewith to prevent application of continuous reset signals to the base of a transistor shunting the timing capacitor.

---

This invention relates to circuit breakers and is particularly directed to solid-state circuit breakers for controlling current flow from a direct current source in response to an applied control signal.

Circuit breakers are frequently employed in control circuits and the like to protect portions of the circuit or apparatus against damage in the event of overloads or short circuiting in other portions of the circuit. Numerous types of devices have been proposed heretofore for this purpose. However, none of the prior art devices have been entirely satisfactory. Fuses provide the desired protection, but cannot be reset after an overload has occurred. Electromechanical circuit breakers can sometimes be tripped inadvertently by mechanical causes, such as shock or vibration. Also, electromechanical circuit breakers may fail to operate due to rust, mechanical breakage, or the like. Furthermore, electro-mechanical circuit breakers are relatively large and heavy.

These disadvantages of the prior art are overcome with the present invention and a solid-state circuit breaker is provided which is extremely light and compact, is immune to shock and vibration, and is remotely resettable; yet which is durable, reliable, and is compatible with integrated circuit control.

The advantages of the present invention are preferably attained by providing a solid-state circuit comprising a power transistor or switch, a driver, a voltage sensor, a timing circuit, and a control circuit.

Accordingly, it is an object of the present invention to provide improved circuit breaker means.

Another object of the present invention is to provide a solid-state circuit breaker.

An additional object of the present invention is to provide a solid-state circuit breaker which is compact and light in weight; yet is durable, reliable, and is compatible with integrated circuit control.

A further object of the present invention is to provide a solid-state circuit breaker which is immune to shock and vibration.

A specific object of the present invention is to provide a solid-state circuit breaker comprising a power transistor, a driver, a voltage sensor, a timing circuit, and a control circuit.

These and other objects and features of the present invention will be apparent from the following detailed description taken with reference to the accompanying drawing.

In the drawing:

The figure is a diagrammatic representation of a solid-state circuit breaker embodying the present invention.

The form of the present invention chosen for purposes of illustration, the figure shows an NPN power transistor 2 having the collector 4 thereof connected to a suitable direct-current supply source 6, while the emitter 8 of the transistor 2 is connected to a suitable direct-current load 10 and, thence, to ground. Transistor 2 functions as a switch and is actuated by a driver circuit comprising a PNP transistor 12 and resistors 14 and 16. Transistor 12 has its emitter 18 connected to source 6 and its collector 20 connected to the base 22 of switch transistor 2. Resistor 14 is connected between the collector 20 of transistor 12 and ground, while resistor 16 is connected between the emitter 18 and base 24 of transistor 12. Resistor 26 has one end thereof connected to the base 24 of transistor 12, while the other end of resistor 26 is connected in series with capacitor 28 to the collector 30 of control transistor 32. The maximum current level of faults and overloads is limited by resistor 26, while the time duration of this current limiting is determined by resistor 26 and capacitor 28. Control transistor 32 has its emitter 34 connected to ground and has its base 36 connected through resistive network 38 to suitable ON-OFF control signal source 40. To sense an overload or fault, Zener diode 42 has its sensing electrode connected to sensing junction 44, between the emitter 8 of switch transistor 2 and the load 10, and has its reference electrode connected through resistor 46 to the base 48 of transistor 50. The collector of transistor 50 is connected between resistor 26 and capacitor 28, while the emitter of transistor 50 is connected to the collector 30 of transistor 32. Finally, a suitable reset signal source 52 is connected through capacitor 54 and resistive network 56 to the base 48 of transistor 50. Diodes 58 and 60 are used to provide circuit isolation.

In operation, control means 40 applies a logical "ONE" signal to the base 36 of control transistor 32 which biases transistor 32 ON and causes capacitor 28 to start charging, toward the value of the supply source 6, through resistor 26 and the emitter-to-base junction of transistor 12. This biases transistor 12 ON which, in turn, biases switch transistor 2 ON and allows current to flow from supply source 6 through switch transistor 2 to the load 10. Under normal conditions, the potential at sensing junction 44 will be equal to or greater than the reference voltage established by Zener diode 42, resistor 46, diode 60, the base-to-emitter junction of transistor 50, and the collector-to-emitter junction of control transistor 32. Accordingly, current will flow through Zener diode 42, resistor 46, and diode 60 to the base of transistor 50. This biases transistor 50 ON which places the collector-to-emitter junction of transistor 50 in shunt with capacitor 28. This serves to discharge capacitor 28 and to hold transistors 12 and 2 biased ON.

In the event of a fault or overload, the potential at sensing junction 44 will fall below the rated reference voltage. Should this occur, Zener diode 42 will become non-conductive; whereupon, a "trip-out" cycle will be initiated in which no biasing current will flow to base 48 and transistor 50 will be turned OFF, causing capacitor 28 to start charging toward the voltage of the supply source 6. Resistor 26 and capacitor 28 provide a time delay which serves to prevent tripping of the breaker circuit by transient overloads or the like. However, if the overload continues beyond the duration of this time delay, the charging of capacitor 28 will halt the flow of bias current through transistor 12 which will cause transistor 12 to turn OFF. This halts the flow of biasing current to switch transistor 2 which turns switch transistor 2 OFF and stops the flow of current from supply source 6 to the load 10.

To reset the circuit, the reset signal source 52 applies a logical "ONE" signal through capacitor 54, resistive network 56, and diode 58 to the base 48 of transistor 50. This signal biases transistor 50 ON which discharges capacitor 28 and rearms the circuit. Obviously, if the overload condition still exists, the "trip-out" cycle will be repeated. Capacitor 54 serves to prevent repeated recycling of the circuit in the event a continuous "reset" signal is applied.

Obviously, numerous variations and modifications may be made without departing from the present invention. Accordingly, it should be clearly understood that the form of the present invention described above and shown in the accompanying drawing is illustrative only and is not intended to limit the scope of the invention.

What is claimed is:
1. A solid-state circuit breaker comprising:
a direct voltage source;
a direct voltage load connected to be energized by said source;
a switching transistor having the collector-to-emitter junction thereof connected in series between said source and said load, to control energization of said load by said source;
a driver circuit connected in series between said source and the base of said switching transistor to control the application of bias potential to the base of said switching transistor;
a control transistor having the collector-to-emitter junction thereof connected in series between said driver circuit and ground;
a timing circuit consisting of a series-connected resistor and capacitor interposed between said driver circuit and the collector-to-emitter junction of said control transistor, said timing circuit being operable to turn OFF said driver circuit upon charging of said capacitor;
voltage responsive means connected to sense the potential at a point between said source and said load and operable to prevent charging of said capacitor when said potential exceeds a predetermined value and to allow said capacitor to charge when said potential is less than said pre-determined value; and
means for applying potential to the base of said control transistor to activate said circuit breaker.
2. The circuit of claim 1 wherein said driver circuit comprises:
a PNP transistor having the emitter-to-collector junction thereof connected in series between said source and the base of said switching transistor; and
resistance means connecting the emitter and the base of said PNP transistor.
3. The circuit of claim 1 wherein said voltage responsive means comprises:
a shunt transistor having the collector-to-emitter junction thereof connected in shunt with said capacitor; and
a Zener diode having the sensing electrode thereof connected to a point between the emitter of said switching transistor and said load and having the reference electrode thereof connected to apply potential to the base of said shunt transistor when the potential at said point exceeds a predetermined value.
4. The circuit of claim 3 further comprising:
a reset signal source,
means connecting said reset signal source to the base of said shunt transistor; and
means for preventing continuous application of signals from said reset source to the base of said shunt transistor.
5. A solid-state circuit breaker comprising:
a direct voltage source;
a direct voltage load;
a first transistor having a collector connected to said source, an emitter connected to said load, and a base;
a PNP transistor having an emitter connected to said source, a collector connected to the base of said first transistor, and a base;
a first resistance having one end connected to the base of said first transistor and the second end connected to ground;
a second resistance having one end connected to the emitter of said PNP transistor and having the other end connected to the base of said PNP transistor;
a first capacitor;
a third resistance having one end connected to the base of said PNP transistor and having the other end connected to one side of said first capacitor;
a control transistor having a collector connected to the free side of said first capacitor, an emitter connected to ground, and a base;
an ON-OFF control signal source connected to apply signals to the base of said control transistor;
a shunt transistor having a collector connected between said third resistance and said first capacitor, an emitter connected to the collector of said control transistor, and a base;
a Zener diode having a sensing electrode connected to the emitter of said first transistor and a reference electrode resistively connected to the base of said shunt transistor;
a reset signal source connected to apply signals to the base of said shunt transistor; and
a second capacitor connected in series between said reset signal source and the base of said shunt transistor to prevent application of continuous reset signals to the base of said shunt transistor.

References Cited

UNITED STATES PATENTS 2,959,717 11/1960 Conger _____ 317—31 X
3,409,802 11/1968 Savage _____ 317—31

JAMES D. TRAMMELL, Primary Examiner

U.S. Cl. X.R.

307—293; 317—31, 33, 36, 49